US011736418B2

(12) United States Patent
Pelov (10) Patent No.: US 11,736,418 B2
(45) Date of Patent: *Aug. 22, 2023

(54) DECISION TREE PROCESSING FOR CHATBOT DIALOG FLOW

(71) Applicant: ORACLE INTERNATIONAL CORPORATION, Redwood Shores, CA (US)

(72) Inventor: Lyudmil Valentinov Pelov, Hamburg (DE)

(73) Assignee: Oracle International Corporation, Redwood Shores, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/242,136

(22) Filed: Apr. 27, 2021

(65) Prior Publication Data

US 2021/0264222 A1   Aug. 26, 2021

Related U.S. Application Data

(63) Continuation of application No. 16/427,013, filed on May 30, 2019, now Pat. No. 11,023,787.

(60) Provisional application No. 62/747,886, filed on Oct. 19, 2018.

(51) Int. Cl.
| | |
|---|---|
| H04L 51/02 | (2022.01) |
| G06F 16/332 | (2019.01) |
| G06F 16/35 | (2019.01) |
| G06F 18/243 | (2023.01) |
| G06F 18/21 | (2023.01) |

(52) U.S. Cl.
CPC ......... *H04L 51/02* (2013.01); *G06F 16/3329* (2019.01); *G06F 16/353* (2019.01); *G06F 18/217* (2023.01); *G06F 18/24323* (2023.01)

(58) Field of Classification Search
None
See application file for complete search history.

(56) References Cited

U.S. PATENT DOCUMENTS

| | | | |
|---|---|---|---|
| 11,023,787 B2* | 6/2021 | Pelov | G06F 16/353 |
| 11,037,554 B1* | 6/2021 | Le Chevalier | G10L 15/16 |
| 11,425,215 B1* | 8/2022 | Lewis | G06F 9/4881 |
| 2018/0268818 A1* | 9/2018 | Schoenmackers | G10L 15/26 |
| 2019/0104092 A1* | 4/2019 | Koohmarey | H04L 51/02 |
| 2019/0266287 A1* | 8/2019 | Chen | G06F 16/3329 |
| 2020/0027553 A1* | 1/2020 | Vaughn | G16H 10/60 |

* cited by examiner

*Primary Examiner* — Stella L. Woo
(74) *Attorney, Agent, or Firm* — Trellis IP Law Group, PC (57) ABSTRACT

Implementations described here provide a chatbot system that is configurable to meet the needs of the user. In one implementation, a chatbot system is configured to utilize and vary decision trees, decision tree complexity, and decision tree selection adaptive to the needs of the end user. Further, implements may utilize decision trees that are configured as static or dynamic using independent leaves and skillsets to allow for variations in the level of sophistication needed for a chatbot conversation. In other implementations, a chatbot system may be configured to assess the chatbot scenario and requirements in order to adapt processing requirements in order to increase or decrease processing threads to vary processing efficiency relative to the needs of the user. In some scenarios, the chatbot system described herein is introspective thereby using feedback and data to be adaptive to chatbot session errors and self-healing.

20 Claims, 10 Drawing Sheets

```
{
  "SkillSetName": {
    "properties": {
      "propertyName": "value",
      "$criteria": "Function()"
    },
    "options": [
      {
        "properties": {                    ← 402
          "$lastIntent": "AnotherIntent",
          "$gotoAskToHelpUser": "SetNewProperty",
          "YESNO": "YES",
          "criterion": "Function()"
        },
        "actions": {                       ← 404
          "newPropertyName": "value",
          "$gotoIntent": "ExpenseCreate",
          "$gotoIntentNow": "ExpenseData"
        },
        "responseItems": [                 ← 406
          {
            "text": [
              "I'm user text response"
            ]
          }
        ]
      },
      {
        // next option
      }
    ]
  }
}
```

FIG. 5

```
{
  "SkillSetA": {
    "properties": {},
    "options": [
      {                                          ← 310A
        "properties": {
          "isPhoneModelProvided": "false"
        },
        "actions": {},
        "responseItems": [
          {
            "text": [
              "Sorry you would need to specify phone model!"
            ]
          }
        ]
      },
      {                                          ← 310C
        "properties": {
          "isPhoneModelProvided": "true",
          "modelAvaiableInStore": "false"
        },
        "actions": {},
        "responseItems": [
          {
            "text": [
              "I am sorry this model is not provided, try again with another model name!"
            ]
          }
        ]
      },
```

FIG. 6A

```
{
    "properties": {
        "isPhoneModelProvided": "true",      ← 310D
        "modelAvaiableInStore": "true"
    },
    "actions": {
        "$gotoIntentNow": "SkillSetB"
    },
    "responseItems": [
        {}
    ]
  }
 ]
},
"unresolved": {                              ← 310B
  "properties": {},
  "actions": {},
  "responseItems": [
    {
      "text": [
         "I am sorry, I can't find a way to resolve your query, could you try again please?"
      ]
    }
  ]
 }
}
```

```
{
    "properties": {                    ← 310E
        "hasColor": "false"
    },
    "actions": {},
    "responseItems": [
        {
            "text": [
                "Please select phone color!"
            ]
        }
    ]
},
{
    "properties": {                    ← 310F
        "hasColor": "true"
        "hasCapacity": "false"
    },
    "actions": {},
    "responseItems": [
        {
            "text": [
                "Please select phone capacity!"
            ]
        }
    ]
}
}
```

DECISION TREE PROCESSING FOR CHATBOT DIALOG FLOW

CROSS REFERENCES TO RELATED APPLICATIONS

This application is a continuation of the following application, U.S. patent application Ser. No. 16/427,013, entitled METHOD, SYSTEM AND PROGRAM FOR GENERATING DECISION TREES FOR CHATBOTS DIALOG FLOW CAPABILITIES, filed on May 30, 2019, which claims the benefit of U.S. Provisional Patent Application Ser. No. 62/747,886, entitled METHOD, SYSTEM AND PROGRAM FOR GENERATING DECISION TREES FOR CHATBOTS DIALOG FLOW CAPABILITIES, filed on Oct. 19, 2018, which is hereby incorporated by reference as if set forth in full in this application for all purposes.

BACKGROUND

The following relates to chatbot platforms. More specifically the following relates to a utility configurable by a user, which is configured to allow a user to implement and configure chatbot systems for more predictable outcomes.

Generally, chatbot systems also known as a chatbots, talkbots, chatterbots, Bots, IM bots, interactive agents, artificial conversational entities, etc., are computer programs designed to simulate human conversation by using key pre-calculated user phrases and auditory or text-based signals. In some scenarios, chatbots are used for basic customer service and marketing systems that frequent social networking hubs and instant messaging (IM) clients. They also may be included in operating systems as intelligent virtual assistants.

Unfortunately, current chatbots fail to deliver user experiences that are as seamless, delightful, and efficient as they were designed to emulate. Generally, chatbots do not understand context as humans do. Therefore, the current state of the art chatbots often confuse statements, which may lead to frustration by the end user.

Moreover, conventional chatbot systems currently rely on conventional decision trees, which are linear in nature and become over complex as developers attempt to make and use decision trees using a "one size fits all" approach.

SUMMARY

Implementations described here provide a chatbot system that is configurable to meet the needs of the user. In one implementation, in response input data and properties of the data, a chatbot system is configured to load a decision tree skillset model, traverse the skillset model, and based on the input and properties of the input data, identify which leaf of the decision tree should be employed. In some scenarios, the leaf may be resolved using pre-defined properties and/or dynamic functions.

Further, implements may utilize leaves configured to respond statically or dynamically to allow for variations in the level of sophistication needed for a chatbot conversation. Unlike conventional decision trees which are one way in their response and flow based on fixed responses to dialog, decision tree implementations described herein utilize a recursive and adaptable process to resolve which leaf or leaves would be suitable for a response and how to respond to a dialog flow.

In one implementation, a chatbot system may be configured to change skillsets dynamically at any state and any point in the communication (e.g., chat, dialog, etc.) process, with dependencies linked between the skillsets. The dependencies between the current skillsets and the new skillset being transferred to may be used to inform and/or influence the decision process of the new skillset(s). As such, the transition of the new skillset from the previous skillset may contain all or some of the properties of the previous skillset(s).

In other implementations, chatbot system described herein may be configured to assess the chatbot sessions, inputs, dialog, and other requirements in order to adapt processing requirements to increase or decrease processing threads to vary processing efficiency relative to the needs of the user. In some scenarios, the chatbot system described herein is introspective thereby using feedback and data to be adaptive and self-healing.

A further understanding of the nature and the advantages of particular embodiments disclosed herein may be realized by reference of the remaining portions of the specification and the attached drawings.

DETAILED DESCRIPTION

Implementations described here provide a chatbot system that is configurable to meet the needs of the user. In one implementation, in response input data and properties of the data, a chatbot system may be configured to load one or more decision tree skillset models, traverse the skillset models, and based on the input and properties of the input data, properties of the leaves, actions associated with the leaves, and response items, identify which leaf of the decision trees should be employed. Skillsets models, also referred to as skillsets, as described herein may be used to dynamically extend and adapt decision trees and their capabilities in order to adapt to and process dialog flow.

In some implementations, leaves may be resolved recursively using pre-defined properties and/or dynamic functions. Further, implements may utilize leaves configured to respond statically or dynamically to allow for variations in the level of sophistication needed for a chatbot conversation. Unlike conventional decision trees which are one way in their response and flow based on fixed responses to dialog, decision tree implementations described herein may employ a recursive and adaptable process to resolve which leaf or leaves would be suitable for a response and how to respond to a dialog flow.

In exemplary implementations, the chatbot system may change skillsets dynamically at any state and any point in the process, with dependencies between the skillsets. For example, during an online ordering chat dialog process when a user asks the chatbot system about a completely different topic, the chatbot system may respond by changing to a new skillset while retaining the information from the previous session(s) using the other skillset(s), and inform the user, for example, that they will answer the question after finishing the order.

Moreover, implementations described herein may employ and/or inherit at least some of the properties from the previous skillset and data from the previous skillset and chat session to assist in finding new skillsets. Thus, previous skillsets may be used to inform the new skillsets how to respond and/or influence the new skillset's decision processing.

Figure 1:
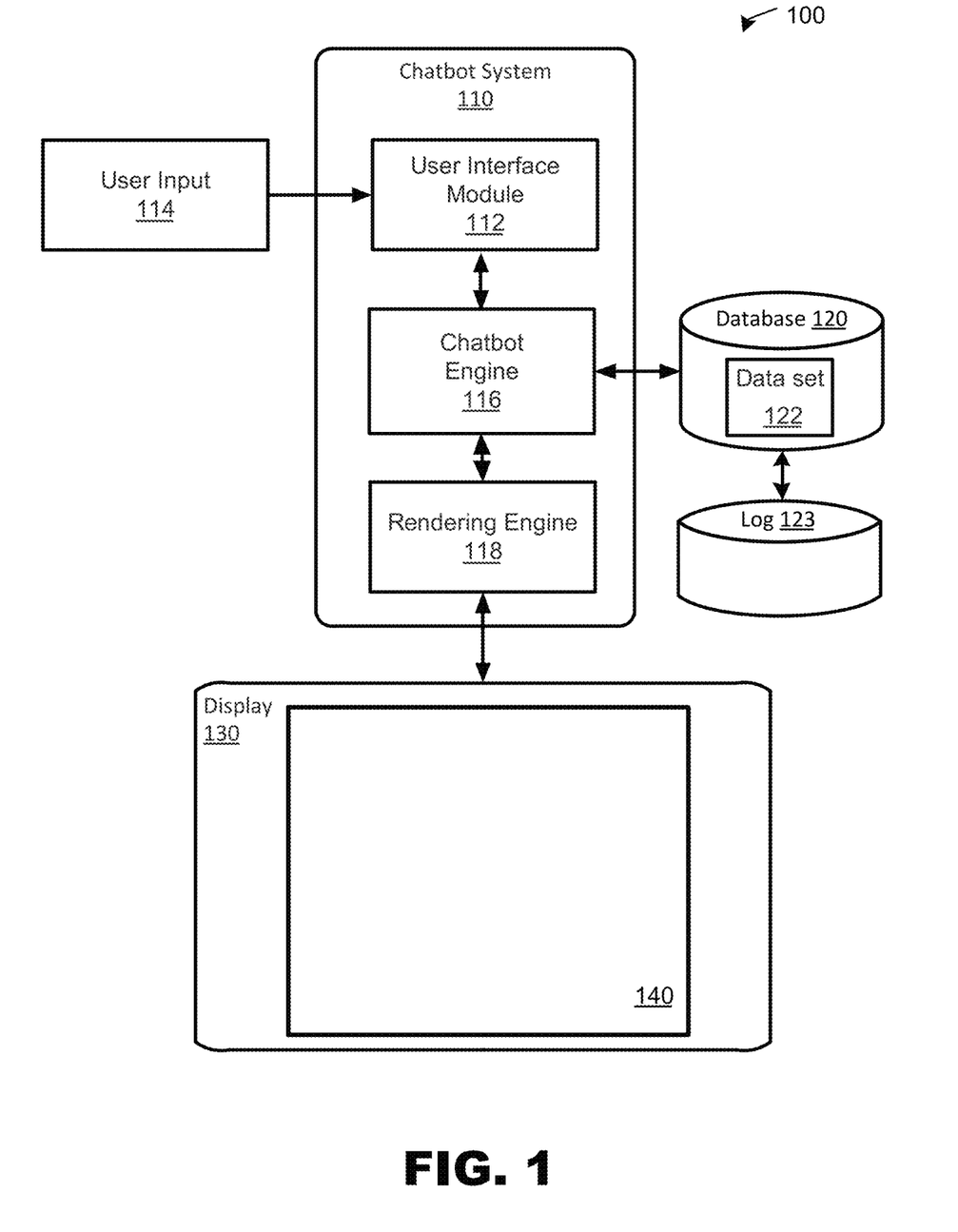
FIG. 1 is a high-level illustration of a computing system used for a chatbot system.

FIG. 1 is a high-level block diagram of an exemplary computing system 100 for generating schemas, decision trees, and the like, used, for example, with implementing chatbot sessions. Computing system 100 may be any computing system, such as an enterprise computing environment, client-server system, and the like. Computing system 100 includes chatbot system 110 configured to process data received from a user interface 114, such as a keyboard, mouse, etc., with regard to processes such as chatting, texting, generating, configuring, modeling, labeling, data binding, maintenance, etc., associated with data elements, information, and the like as described herein.

Note that the computing system 100 presents a particular example implementation, where computer code for implementing embodiments may be implemented, at least in part, on a server. However, embodiments are not limited thereto. For example, a client-side software application may implement chatbot system 110, or portions thereof, in accordance with the present teachings without requiring communications between the client-side software application and a server.

In one exemplary implementation, chatbot system 110 may be connected to display 130 configured to display data 140, for example, to a user thereof. Display 130 may be a passive or an active display, adapted to allow a user to view and interact with graphical data 140 displayed thereon, via user interface (UI) 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to generate chatbot sessions, decision trees, schemas, convert data, model, analyze, deploy schemas, maintain data 140, etc.

In some implementations, computing system 100 may include a data source such as database 120. Database 120 may be connected to the chatbot system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to chatbot sessions, decision trees, schemas, data attributes, data models, data structures, data hierarchy, nodal positions, values, value types, summations, visualizations, algorithms, code (e.g., JSON, JavaScript, XSD, XML, etc.), source, security, hashes, and the like. In addition, data sets 122 may also contain other data, data elements, and information such as metadata, labels, development-time information, run-time information, user configuration information, API, interface component information, library information, error threshold data, pointers, and the like.

Chatbot system 110 may include user interface module 112, chatbot engine 116, and rendering engine 118. User interface module 112 may be configured to receive and process data signals and information received from user interface 114. For example, user interface module 112 may be adapted to receive and process data from user input associated with data 140 for processing via chatbot system 110.

In some implementations, computing system 100 may include log 123. Log 123 may be connected to the chatbot system 110 directly or indirectly, for example via a network connection, and may be implemented as a non-transitory data structure stored on a local memory device, such as a hard drive, SSD, flash memory, and the like, or may be stored as a part of a Cloud network, as further described herein. Log 123 may also be coupled to and/or part of database 120.

In exemplary implementations, chatbot engine 116 may be adapted to receive data from data sources such as user interface 114 and/or database 120 for processing thereof. In one configuration, chatbot engine 116 is a software engine configured to receive and process input data, such as chat, text, video, output schema parameters, etc., from a user thereof pertaining to data 140 from user interface module 114 and/or database 120 in order to generate a chatbot session, and then validate and configure the chatbot session relative to, for example, a type of chatbot session, processing efficiency, and error thresholds. For example, during a validation process, chatbot engine 116 may analyze data objects in the chatbot session along with input parameters, processor efficiency thresholds, chatbot session types, etc. in order to verify and configure decision tree(s) to and/or contextual process to employ during the chatbot session.

Moreover, chatbot engine 116 may be used to determine whether errors in the chatbot session are within acceptable levels, where some conversion error thresholds may be set for benign errors (e.g., errors that may not cause system failure, chatbot session failure, etc.) and/or for other types of user and/or system acceptable errors, thereby providing for an adjustable chatbot session error tolerance. For example, chatbot engine 116 may allow for a chatbot session with an acceptable threshold level of errors, such as system errors, lopping errors, context errors, spelling errors, grammatical errors, and the like.

In some scenarios, chatbot engine 116 may be configured to analyze and ignore words, phrases, symbols, acronyms, etc., that may be considered erroneous in one chatbot session but not necessarily in another chatbot session. For example, in the context of software programming, chatbot 116 may be configured to determine that a chatbot session is within the context of programming in a particular programming language (e.g., C++) and allow for variations in data input to within a tolerance level to avoid chatbot system 110 from failing (e.g., crashing), avoiding perpetual conversation loops, etc.

Chatbot engine 116 may also be configured to be self-healing to correct and resolve such errors later, or on the fly, with or without warnings given to a user thereof, in a recursive manner, for example, by using techniques such prompting the end user for clarification, suggesting alternative conversations, asking questions, analyzing previous sessions by the end user, etc.

Chatbot engine 116 in other implementations may be configured as a data analysis tool to perform analysis functions associated with data 140. Such analysis functions may include determining attributes associated with data 140, determining the type of data, relationship of the data to types of chatbot sessions, determining the values of the data, data types, determining the relationships to other data, interpreting metadata associated with the data, determining error types, tolerance data, and the like.

For example, chatbot engine 116 may be configured to receive and analyze data sets 122 to determine chat session wording, phrases, acronyms, context, data properties, types of errors, error tolerance levels, schema types, user interface configuration, definitions, data processing instructions, data attributes, data hierarchy, nodes, nodal positions within the hierarchy, values, data type, summations, algorithms, source, security, hashes, and the like, associated with data sets 122.

Chatbot engine 116 may receive existing data sets 122 from database 120 for processing thereof. Such data sets 122 may include and represent a composite of separate data sets 122 and data elements pertaining to, for example, organizational data, which may include data such as employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122 associated with data 140. In one implementation, upon receiving instruction from a user, for example, through user interface 114, rendering engine 118 may be configured to generate a real-time display of interactive changes being made to data 140 by a user thereof.

Figure 2:
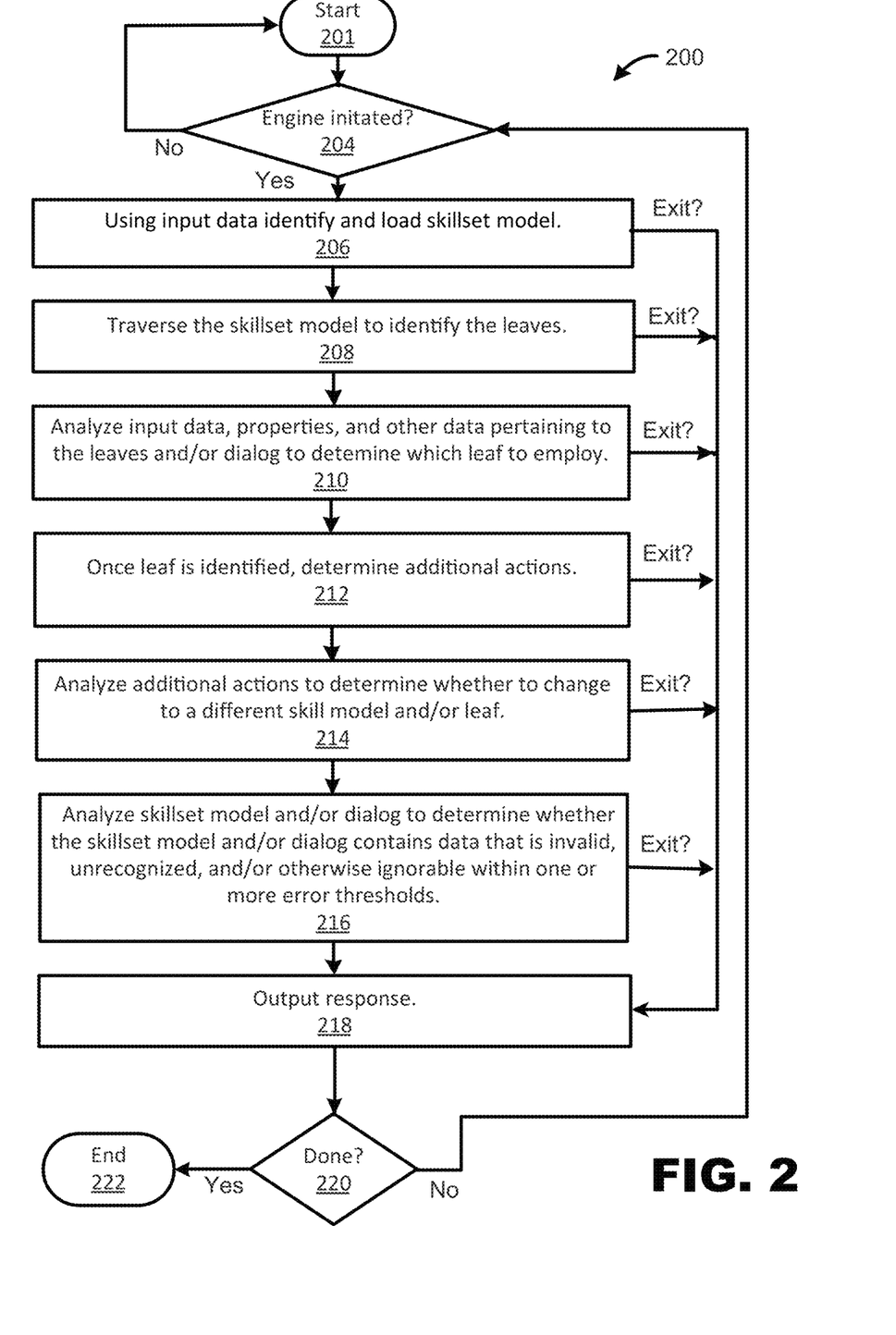
FIG. 2 illustrates a high-level flow diagram of a dialog and decision tree method for implementing a chatbot session.

FIG. 2 illustrates a high-level flow diagram of a dialog and decision tree method 200 for implementing chatbot sessions. In one implementation, method 200 may be entered into at 201 when, for example, chatbot system 110 is invoked. At 204, method 200 determines whether, for example, chatbot system 110 has been initiated for a chatbot session. If at 204, chatbot system 110 has not been initiated, then method 200 proceeds to 201. If however, chatbot system 110 has been initiated to perform, for example, a chatbot session, method 200 proceeds to 206.

At 206, process 200 receives and process input data, which is then employed by process 200 to determine which skillset model to load. The input data may be virtually any data that may be used to advantage. In some implementations, the data input may be from chatbot system 110, may be intent by the user, parsed entities or other related variables that method 200 may employ to classify the flow path of the dialog. However, if there is no input data or skillset model, in some cases, to allow chatbot system 110, for example, to end or seek another avenue for the dialog, method 200 may exit to 220.

At 208, method 200 traverses one or more leaves of the skillset model to identify leaves. For example, leaves may be configured as preset leaves that act in a particular way to a dialogue, or may be dynamic leaves that are configured to execute functions or dynamic algorithms in response to the dialogue. Such static and dynamic leaf configurations allow system 100 to be flexible and adapt to variations of the dialogue during a chatbot session. In some cases, if there is no skillset model to identify the leaves, to allow system 100 to end or seek another processing avenue, method 200 may employ an exit operation and exit to 220.

At 210, method 200 analyzes the input data to determine which leaf or leaves may be appropriate for the dialog flow. For example, the input data may be from an online shopper looking to buy a mobile device. Method 200 may be configured to analyze input data or other factors pertaining to the shopper, the device, shopping session, metadata, etc., in order to determine which leaf or leaves to employ in the dialog about the mobile device. As there may be more than one leaf that may be suitable, method 200 may resolve which leaf to use based on a recursive analytical process using algorithms that, for example, use pre-defined properties, dynamic function weighted variables, etc. to provide more or less weight to any of the leaves until at least one leaf is resolved.

However, at 210, if method 200 cannot resolve a leaf, or the leaf does not exist or cannot be found, method 200 may query other data sources such as the user and/or system for additional information to help in resolving the issue. In some cases, to allow system 100 to end or seek another avenue for the dialog, method 200 may employ an exit operation, which may end the session or allow a new skillset to be loaded to provide another route for the dialog flow.

At 212, once at least one leaf is identified in 210, additional actions at that point may be determined. For example, method 200 may look at the actions listed in the leaf to determine what actions to take, if any. Alternatively, the actions may be found in other locations such as database 120, log 123, etc. In some scenarios, actions may be authorized actions that require authorization of a third party, such as an administrator, to control the type of action used in the dialog. For example, where the dialog may become unacceptable, for example, for being "vulgar," the administrator, Artificial Intelligence (AI) system, etc., may quash or change the action to another more acceptable response.

As such, method 200 may be configured to provide a flexible way to monitor the dialog and actions to keep the dialog within acceptable dialog parameters. However, if method 200 has found there is no more actions required to respond as the pre-defined response is adequate, at this state, one or more pre-defined responses may be selected and method 200 proceeds to 218 to output the one or more predefined responses and/or exit to 220.

At 214, depending on the input data and/or other factors, method 200 may decide to switch to another skillset or leaf and transfer some or all of the data to the new location (e.g., skillset or leaf) for further execution. However, if method 200 has found the appropriate leaf and/or there is no more criteria needed to respond as the pre-defined response is adequate, at this state, one or more pre-defined responses may be selected and method 200 proceeds to 218 to output the one or more predefined responses and/or exit to 220.

At 216, method 200 may traverse the decision tree hierarchy and/or dialog and analyze data objects to determine whether the type of data objects are known, unknown, or flagged to ignore. If the type of data object is known, method 200 proceeds to another data object. However, if the data object, such as a dialog input, or data contained therein, is unknown, flagged to ignore, or otherwise deemed to be tolerable within one or more acceptable error thresholds, method 200 proceeds to another node of the decision tree hierarchy and/or dialog.

For example, in the context of shopping, the dialog may include an unknown dialog input such as "#shop now"

where the user is asking system 100 to send a social media link. In this scenario, method 200 may be set to respond to such requests as non-errors, may be set to ignore such items, or may be configured to allow for errors such as extra hash signs, spelling errors, etc., within a predefined level of error tolerance. As such, system 100 is configured to tolerate potential errors introduced into, for example, the dialog.

In some implementations, to allow for different levels of "best effort" error tolerance, one error threshold may be used to set one limit of error tolerance, a second error threshold level may be used to set another level of error tolerance, and so on. Advantageously, utilizing differing error threshold levels allows a user to tailor dialog and data error tolerance to meet a wide range of requirements and needs such as processing efficiency, speed, tolerance, flexibility, and the like.

However, if method 200 has found there is no more actions required relative to errors and the pre-defined response is adequate, at this state, one or more pre-defined responses may be selected and method 200 proceeds to 218 to output the one or more predefined responses and/or exit to 220.

At 218, a response to the dialog may be provided. In some implementations, a response may be any type of data from text to more complex data structure, or such response may resolve to different dialog flow or state as required.

At 220, if the chatbot session is done, method 200 proceeds to 222 and ends. However, if the chatbot session is not done, method 200 proceeds to 204. In some implementations, at 220, method 200 may provide exit action flows. For example, in the case where method 200 cannot select a skillset or leaf, method 200 may return to 204 and use pre-defined exit schemas and/or may provide the capability to specify additional exit schemas to employ new skillsets and/or actions.

In an implementation, at 220, method 200 may log steps of the process flow together with the input and output information into for example, log 123, for use as feedback for improving the operation and dialog response of system 100.

Figure 3:
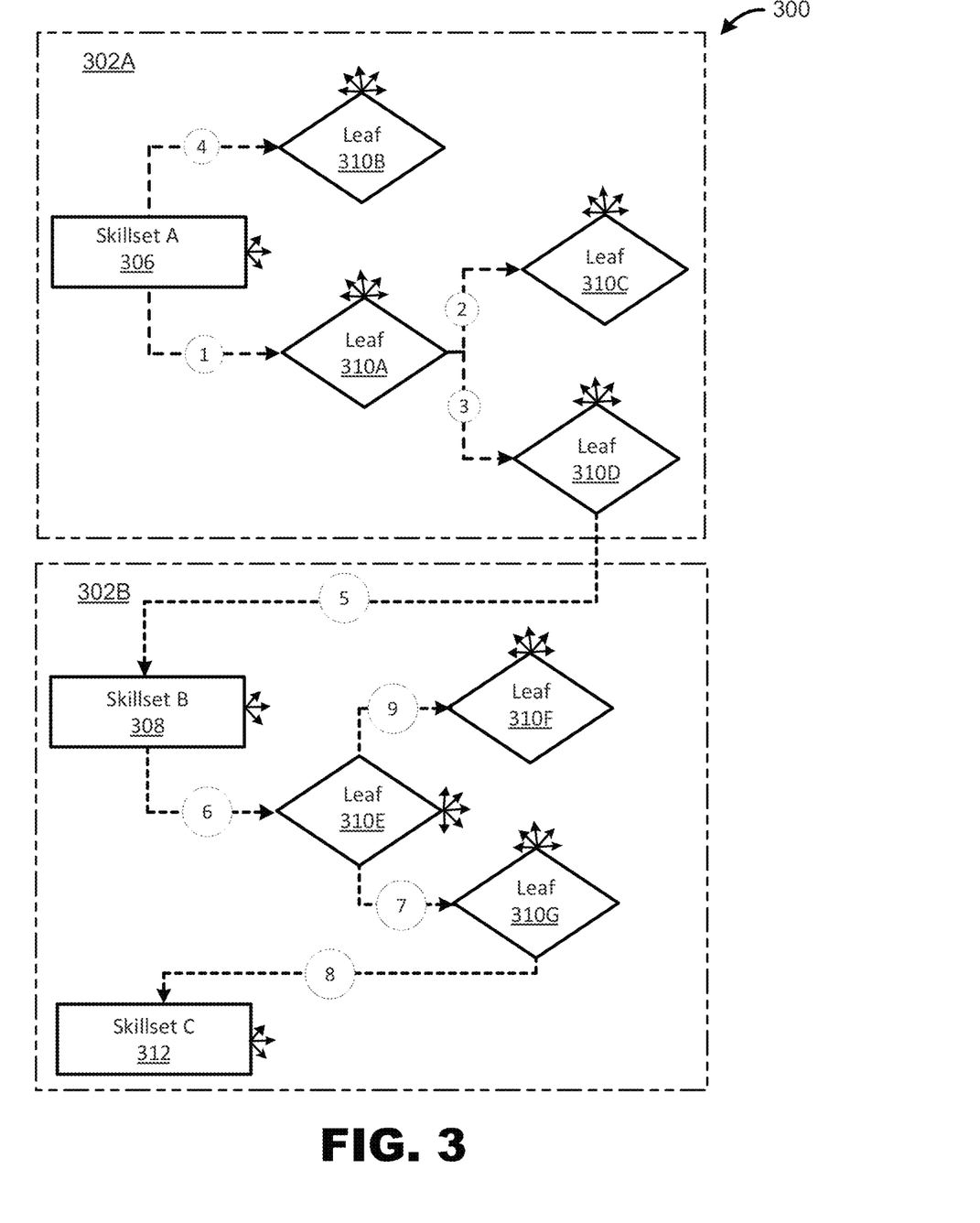
FIG. 3 is a high-level illustration of a dialog decision tree process.

FIG. 3 is a high-level illustration and example of a dialog decision tree process 300. In one implementation, decision tree process 300 includes one or more decision trees 302, such as decision trees 302A and 302B. Decision trees 302 may be configured to make decisions using virtually any data available. However, in other implementations, to reduce processing time and simplify the dialog process, decision trees 302, such as decision trees 302A and 302B, may be configured by system 100, for example, to make a decision to use specific leafs 310 of the decision tree based on the properties in that leaf 310, even if there are more input properties available if they are not defined in the properties. When transferring to a new skillset however the new skillset could have one or more leaves 310 that use those properties if required.

Decision tree 302A includes a skillset A 306, and decision tree 302B includes skillset B 308. Skillsets 306, such as skillset A 306 and skillset 308, may be designed for a particular context and/or operating environment, such as an online shopping environment, software programming environment, emergency call environment, travel environment, technical support environment, customer support environment, and the like. For example, skillset A 306 may be configured to operate in an online shopping environment where the customer is asking questions about products and services.

In this example, decision tree 302A contains skillset A 306 and leaves 310A-310D, and decision tree B 302B contains skillset B 308 and leaves 310E-310G. Leaves 310A-310G may be configured to receive input data, such as data from system 100 employed to process dialog and operate on such input data to provide a response, for example, to a user. As described below, while connection paths are illustrated, leaf action and dialog flow directions are independent and may be determined using a number of factors including but not limited to properties of the leaf 310, actions associated with a leaf 310, and response items which may be predefined or adaptive. Thus, in some implementations, leaves 310 and skillsets 306 may be selected and employed in any order such that the dialog flow and responses are not required to follow a linear decision tree path.

Figure 4:
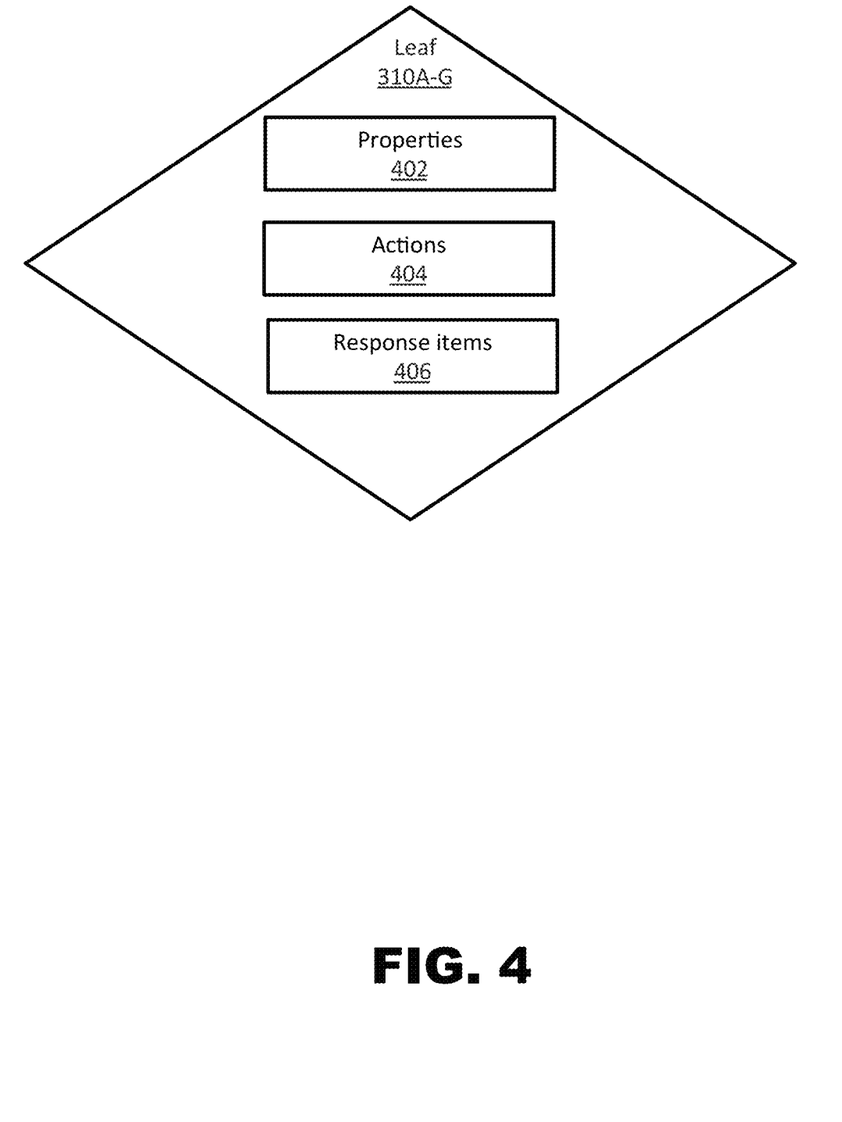
FIG. 4 is a high-level illustration of a leaf of a decision tree.
Figure 5:
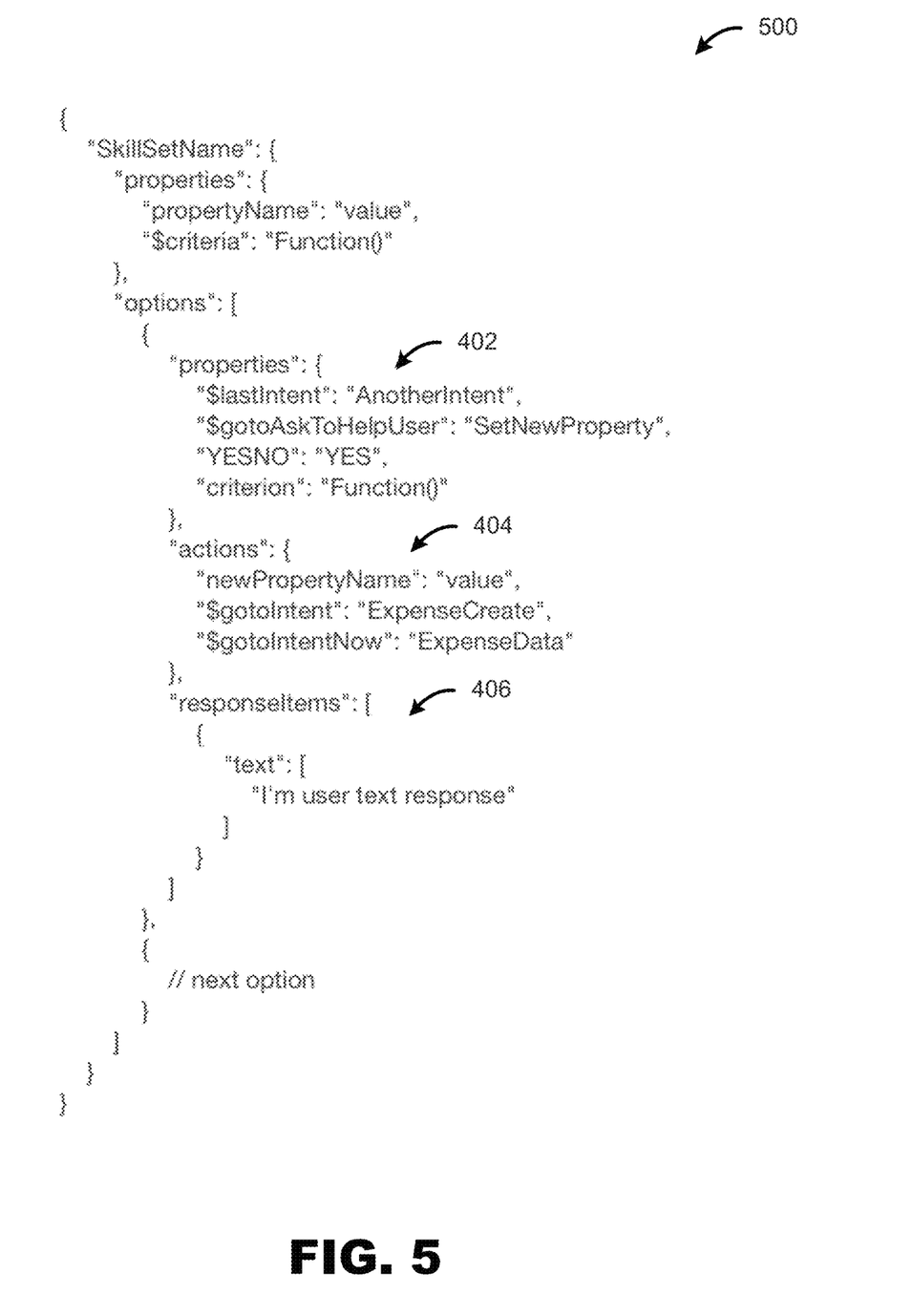
FIG. 5 is a high-level illustration of a decision tree leaf schema.

For example, referring to FIGS. 4 and 5, a leaf 310 may be configured with many different properties 402. In implementations as illustrated in FIG. 5, a leaf 310 may contain a list of properties 402 that may be used by a computing system, such as system 100, invoking a decision tree process 300 to select a particular leaf 310 using, for example, the input dialog data, properties of each leaf 310, and data associated with skillsets provided, such as data from skillset 306 and skillset 308.

Properties may include freely defined properties, pre-defined properties, and include both internal and dynamic properties. Freely defined properties may be those properties that can be configured on the fly, for example, by the user. Predefined properties may have set values. For example, predefined properties may be called using labels such as ""YESNO": YES," which in this example provide for set "yes" and "no" responses.

Properties 402 that are internal properties are those properties that have a property name that is held by a proxy value such as a dollar "$" sign that may be set, for example, by system 100 as required for the particular context of the dialog and/or operating environment. For example, as illustrated in FIG. 5, "$lastIntent" may be a label that represents the name of the last chat intent and may be used to specify future conditions, "$gotoAskToHelpUser" may be used to query data from a user set a new property, etc.

Properties 402 that are dynamic properties are generally enabled via functions that could execute additional code and return conditions. Such functions may receive some or all available properties arguments and input data during the decision tree leaf selection process. For example, dynamic properties like ""criterion": "Function( )"" are functions that could execute additional code and return conditions.

Leaves 310 may also contain actions configured to allow changing the path of execution by transitioning to new leaf 310 or skillset. Such actions may have pre-defined internal conditions, but can also be used to set additional properties, that may be used from the new leaf 310 or skillset (e.g., skillset 306) during the leaf selection process. For example, leaf 310 may contain actions 404 to specify a new skillset, transition actions, specify a static or dynamic variable that may be used to process a new skillset.

As illustrated in FIG. 5, actions 404, for example, may be defined by labels such as "$gotoIntentNow" which may allow leaf 310 to specify new skillset, "$gotoIntent", where the chat session should transition after user takes a specific action, for example when system 100 answers a questions from the responses which then may transition to a new skillset and proceed with a new selection process using the new decision tree skillset. Actions 404 may also include other actions such as "newPropertyName" which is an example of a label calling a variable where the name and value are pre-defined that may be specified to be used in the new skillset during a leaf selection process. Additionally, actions 404 may include labels to call dynamic variables.

Leaves 310 may also include response items 406, which are configured to allow pre-defined chat responses to the end user. Such pre-defined responses may be in the form of text, other data, transitions to new states, dynamically generated randomized texts, etc.

In exemplary implementations, skillsets, such as skillset 306 and 308, and leaves 310 may be configured to provide an efficient, dynamic, and linear and/or non-linear decision tree process during a communication (e.g., chat) session. For example, referring to FIGS. 3-6, in one example, leaf 310A may be configured as a set leaf 310 with predefined property 402, such as ""YESNO": YES" where a dialog response will set the dialog response by either leaf 310C or 310E, no other actions 404, and a predefined response 406 of "Sorry you would need to specify the phone model." In this example, if leaf 310A received dialog that required a response of a "yes" or "no," then the dialog response may be directed to whichever leaf 310C or 310D was referred to by system 100 in providing the response.

In one scenario, as shown in FIGS. 3 and 6, consider the case where a shopper is seeking to buy a mobile phone and leaf 310A is set to respond to a query about mobile phones, where leaf 310A is set for a response if the information provided is insufficient for system 100 to resolve. However, if system 100, for example, parses and resolves the dialog such that system 100 determines if the online store has or doesn't have the particular mobile phone, system 100 may then resolve which leaf 310, such as leaf 310C or 310D to send the data to for providing answers and questions to the user to facilitate transaction flow.

For example, in this particular shopping scenario, system 100 may receive input data from the user such as "do you sell mobile phones?" and uses this data to select skillset A 302. In addition, based on the input data and data contained in skillset A 302 data, system 100 selects leaf 310A as the appropriate leaf 310 to use to respond to the user. Once leaf 310A is selected, system 100 may provide data along flow path "1", such as intent and entities, from skillset A 306 to leaf 310A. Since in this example scenario there is no model number mentioned, there would be no entity data. Since there is no entity data that system 100 can resolve in this example flow, leaf 310A may send a predefined response, given the online store sells mobile phones, at leaf 310A as "Sorry you would need to specify a phone model" and then wait for a response.

However, in one example, had the shopper initially provided the phone model which would provide the entity data, system 100 may select leaf 310C or 310D depending on if the model exist 310D, or the model does not exist 310C in the shop, and send the data input and entity from leaf 310A to leaf 310C or 310D along flow path "2" or "3". In this case, 310C could process the request and then return a response such as "I am sorry this model is not available, try again with different model name!" and wait for the user response to proceed, if the online store does not have the mobile phone in stock. If the model is available 310D may traverse to a new skillset 302B transferring at least some of the available data and entities to the skillset B 308.

In implementations, some data inputs may not be resolved by system 100 using one skillset, such as skillset A 302, but may use other additional skillsets or end the session. For example, referring to FIG. 6B, consider the case where leaf 310B represents an exit option, an unresolved leaf 310. In this case, when system 100 resolves leaf 310B as the appropriate leaf 310, system 100 may send the data to leaf 310B which may respond by submitting a response to the user of "I am sorry, I can't find a way to resolve your query, could you please try again . . . " which would then allow system 100 to end the dialog session and/or wait for further input from the user. In the case that the leaf 310 cannot be resolved at 310B, then system 100 may, in some implementations, either end the session, or use the input data from skillset A 306, the data from other dialog leaves 310, and/or data from skillset B 308 to resolve the dialog path to another decision tree skillset 302.

If a different response was required than from leaf 310A or 310C, and based on the input data, properties 402, actions 404, and response items 406 of leaf 310D, then system 100, for example, may send the input data along flow "3" from leaf 310A to leaf 310D to process the request. For example, suppose that the buyer provided only a partial mobile phone model number. At leaf 310D, if leaf 310D were set to be a static response based on receiving a partial entity match of a phone model, system 100, for example, may resolve the leaf to 310D and then provide responses such as "Can you provide a more complete model number?"

However, if leaf 310D were set to be a dynamic leaf, then leaf 310D may invoke a function to provide a list of possible matches to the user based on the dialog. As such, in this example, leaves 310A, 310C, and 310D, may be individually selected by system 100 to provide a user with a definitive response seeking more information or providing a direct response without having to expand the query using more complicated conventional decision trees.

Figure 6A:
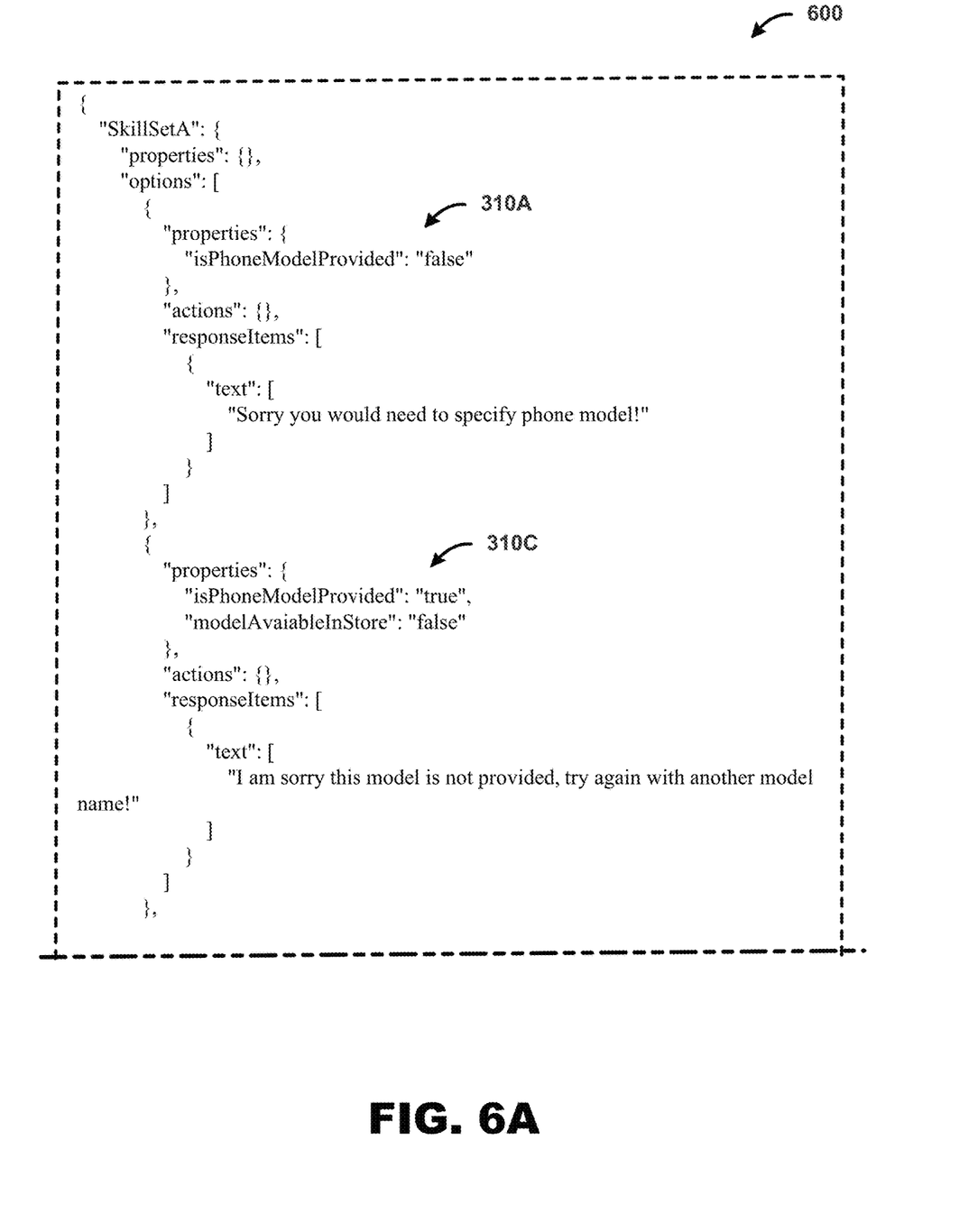
FIGS. 6A-6D depict a high-level illustration of a dialog decision process schema.
Figure 6B:
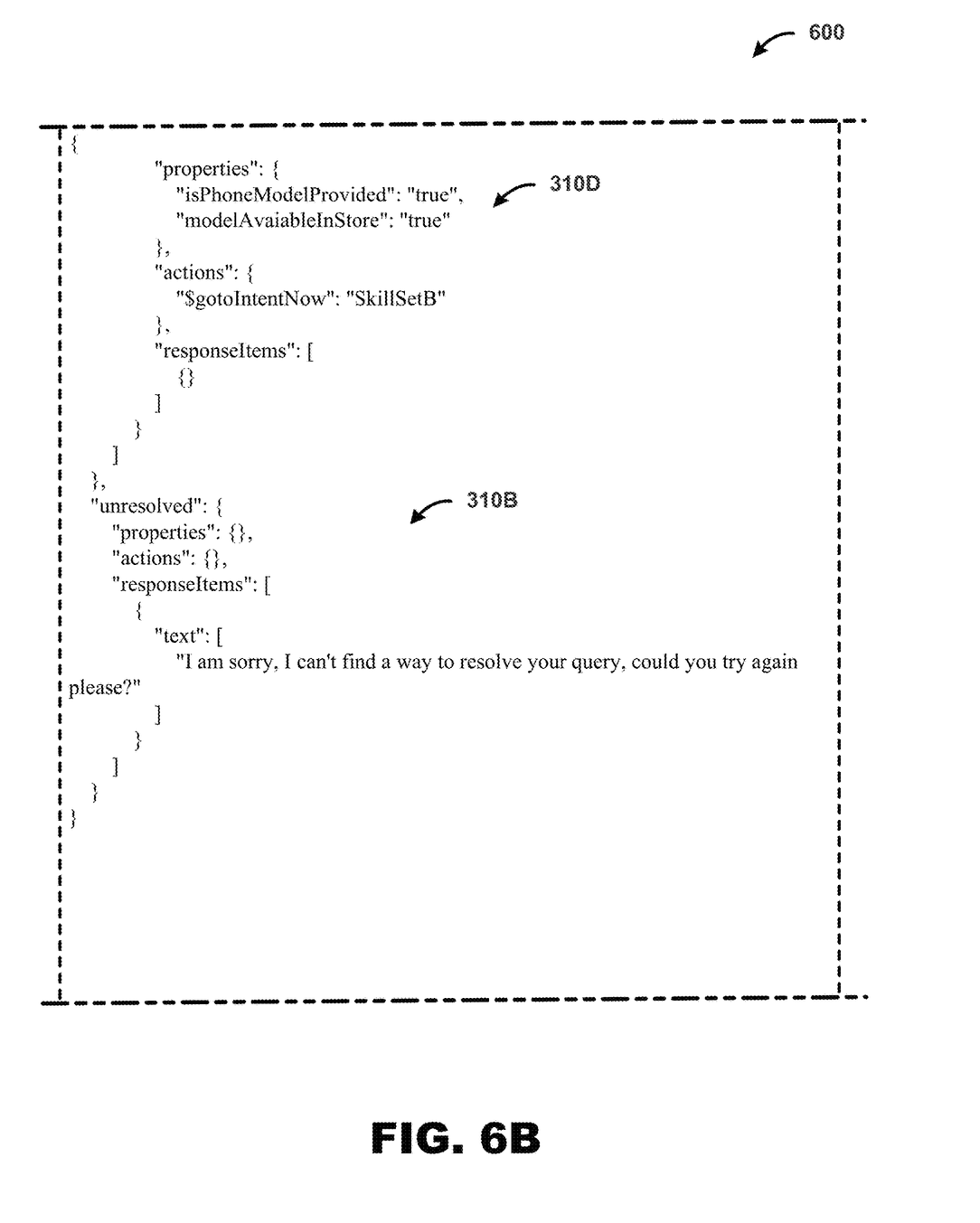

In some implementations, as illustrated in FIG. 3 and FIG. 6B, if system 100 resolves that leaf 310D was the proper leaf 310, but another skillset, such as skillset 308B, may be used to complete the task, system 100, for example, may send the data from skillset A 306 and leaf 310D, along flow path "5" from leaf 310D to skillset B 308. In this data flow path scenario, system 100, for example, may use the information obtained from one decision tree 302 (e.g., 302A) to inform and/or influence another decision tree 302 (e.g., 302B).

For example, referring to the case of the shopper discussed herein, as shown in FIG. 3, skillset 306 may be configured to resolve that leaves 310A, C, and D, will not fully work for this chatbot session based on the interaction with the user. In this scenario, system 100, for example, may then send the processed data along flow path "5" from leaf 310D to skillset B 308, and based on the data and properties of skillset A 306 and leaf 310D, which will either send the data from skillset B 308 to leaf 310E, 310F, or 310G. If system 100, for example determines that based on the data, and the data associated with skillset A 306 and skillset B 308, that leaf 310E is to be employed, then the data, along with data from skillset A 306 and skillset B 308 may be sent along flow path "6" to leaf 310E.

Similar to 310D, leaf 310E may be a static or dynamic response that is different than that from leaves 310A, C, or D. However, since leaf 310E is associated with a different skillset B 308, the response by leaf 310E may be informed and/or influenced by both the data from skillset A 306, skillset B 308, and one or more leaves 310A-D of decision tree 302A.

Figure 6C:
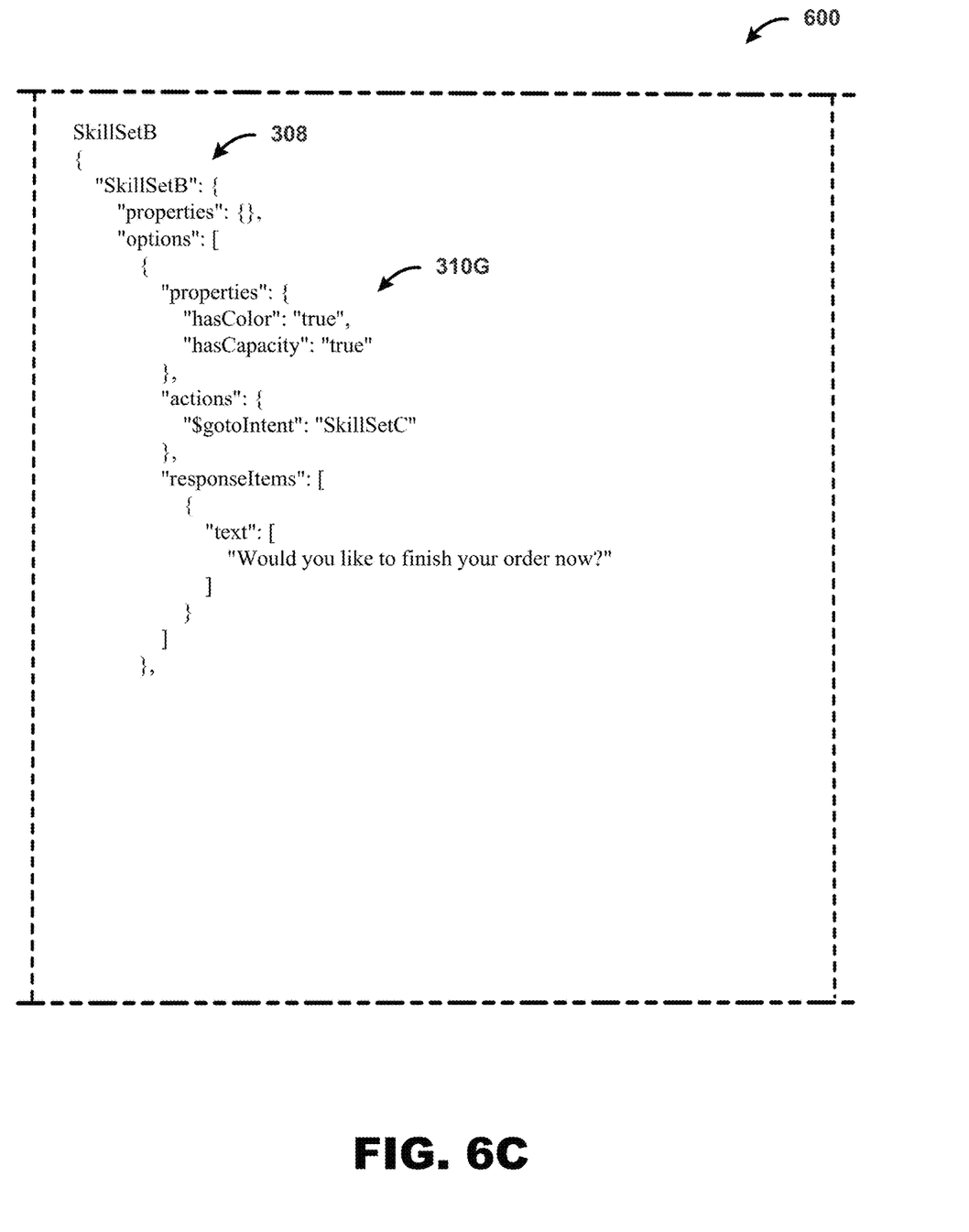
Figure 6D:
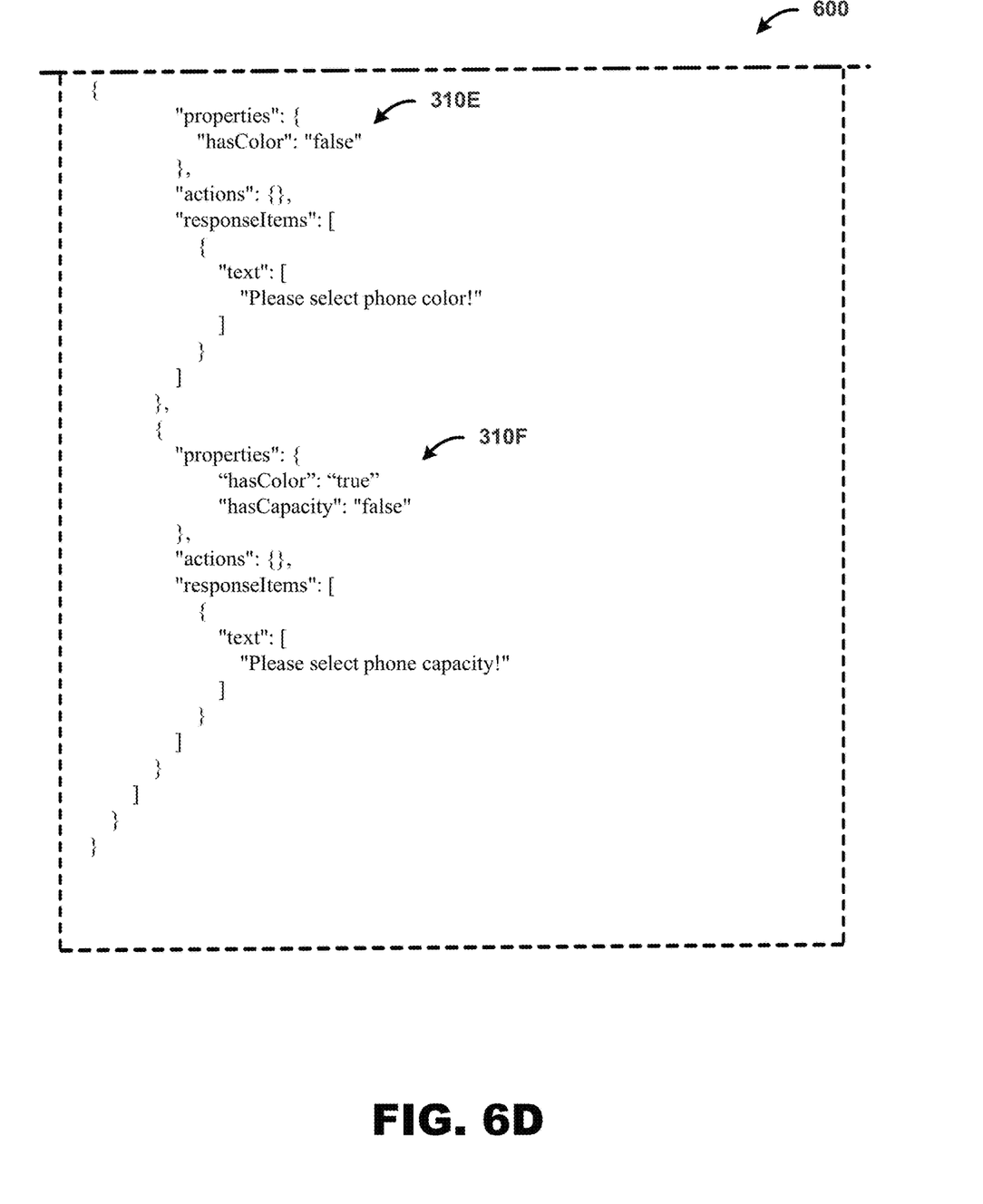

As illustrated in FIGS. 3 and 6A-D, provided after analysis of the input data and information from decision tree 302A and 302B by system 100, for example, that leaf 310G is now the appropriate leaf 310 to respond to the data, data may be sent along flow path "7" from leaf 310E to leaf 310G. As illustrated in FIGS. 3 and 6C, leaf 310G may be configured to send data along flow path "8" to employ skillset C 312, which may be executed after the user answers the question, the action 404 for leaf 310F "$gotoIntent" configures leaf 310G to wait for user response to get new values/entities before it switches to skillset C 312.

However, in the case of actions such as, for example, "$gotoIntentNow" that stipulate immediate transfer, leaf 310G, may be configured to switch immediately to the new skillset C 312, and transfer some or all of its properties to skillset C 312. After switching to the new skillset C 312, leaf 310G may be configured to provide a response, such as "Would you like to finish your order now?" to submit to the user.

As illustrated in FIGS. 3-6, considering leaf 310E is configured based on properties 402, actions 404, and responses 406, to respond to attributes of the item being purchased, such as "color," leaf 310E may provide a response such as "Please select phone color" to the user. Moreover, if system 100 resolves leaf 310F based on processing the data input, and the properties 402, actions 404, and response items 406 of leaf 310F for "phone capacity," along flow path "9" system 100, for example, may provide data to leaf 310F which may provide a response, such as, "Please select phone capacity" to the user.

Thus, in contrast to conventional decision trees which are linearly fixed in their response and flow path based on fixed responses to dialog, decision tree implementations described herein utilize independent, recursive, and adaptable decision tree processes to resolve which leaf or leaves would be suitable for a response and how to respond to a dialog flow. Moreover, implementations as discussed provide for dialog processing that adaptively changes between decision trees and different skillsets while inheriting data from previous chatbot sessions, leaves 310, and skillsets 306 as needed to further refine the process of resolving which leaf 310 and skillset(s) 306 to use for a particular response to the dialog.

Figure 7:
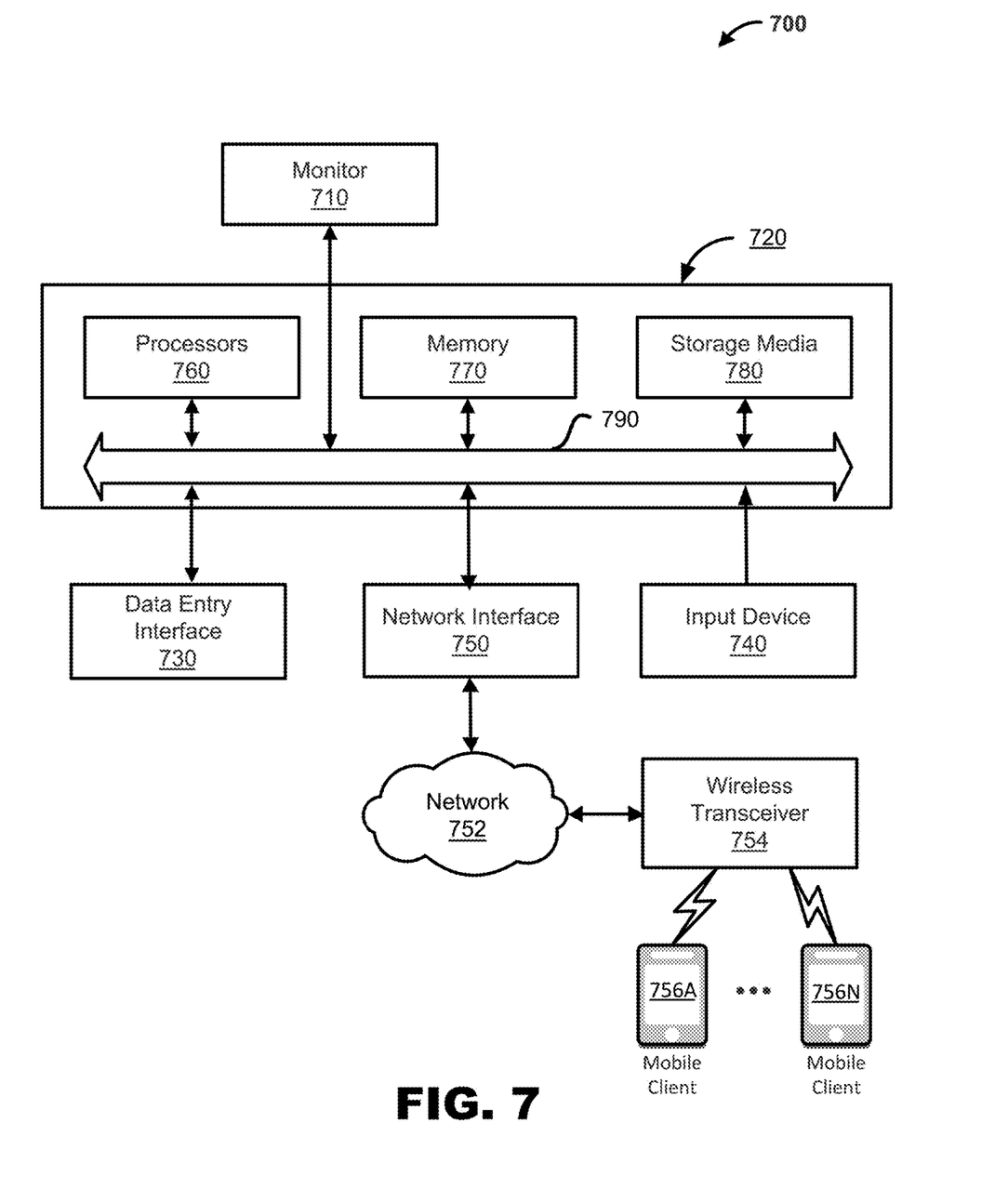
FIG. 7 is a high-level block diagram of an exemplary computer and communication system.

FIG. 7 is a block diagram of an exemplary computer system 700 for use with implementations described herein. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. Communication network 752 may include a local area network, a wide area network, a wireless network, an Intranet, the Internet, a private network, a public network, a switched network, or any other suitable communication network, such as for example Cloud networks.

Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as a processor 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 770 and Storage media 780 are examples of tangible non-transitory computer readable media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although the description has been described with respect to particular embodiments thereof, these particular embodiments are merely illustrative, and not restrictive.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory computer readable medium including one or more instructions executable by one or more processors for:
   receiving first dialog input including a request and associated with a first topic task in a chatbot session;
   traversing a first decision tree including a first skillset model related to the first topic task to identify at least a first task leaf appropriate to address the first dialog input;
   providing a first return response to the first dialog input that is an incompletion of the first topic task in the chatbot session;
   prior to completion of the first topic task, receiving in the chatbot session, second dialog input in response to the first return response and associated with the request;
   determining that the second dialog input is associated with a second topic task different from the first topic task;
   transferring to a second decision tree including a second skillset model related to the second topic task, at least one of a property associated with the first task leaf or data associated with the first skillset model;
   traversing the second decision tree to identify at least two second task leaves;
   analyzing at least one of a property or action associated with each of the at least two second task leaves to identify a target leaf of the at least two second task leaves to employ for the second topic task; and
   outputting a response to the second dialog input.

2. The non-transitory computer readable medium of claim 1, wherein the transferred property or data associated with the first skillset model is used to influence the second skillset model in decision processing.

3. The non-transitory computer readable medium of claim 2, wherein analyzing the at least one of the property or action includes providing weight to one or more of the at least two second task leaves until the target leaf is resolved.

4. The non-transitory computer readable medium of claim 1, wherein identifying the target leaf further includes querying other data sources for information to resolve the target leaf.

5. The non-transitory computer readable medium of claim 1, wherein the target leaf comprises a dynamic response.

6. The non-transitory computer readable medium of claim 1, wherein the first skillset model is configured for a particular context or operating environment different from the particular context or operating environment of the second skillset model.

7. The non-transitory computer readable medium of claim 1, wherein instructions are further for:
   analyzing the first skillset model and second skillset model to detect an error that will cause failure of the chatbot session, wherein the first return response includes a request to for a response to address the error and the second dialog input addresses the error; and
   recursively correcting the error based, at least in part, on second dialog input.

8. A computer implemented method, comprising:
   receiving first dialog input including a request and associated with a first topic task in a chatbot session;
   traversing a first decision tree including a first skillset model related to the first topic task to identify at least a first task leaf appropriate to address the first dialog input;
   providing a first return response to the first dialog input that is an incompletion of the first topic task in the chatbot session;
   prior to completion of the first topic task, receiving in the chatbot session, second dialog input in response to the first return response and associated with the request;
   determining that the second dialog input is associated with a second topic task different from the first topic task;
   transferring to a second decision tree including a second skillset model related to the second topic task, at least one of a property associated with the first task leaf or data associated with the first skillset model;
   traversing the second decision tree to identify at least two second task leaves;
   analyzing at least one of a property or action associated with each of the at least two second task leaves to identify a target leaf of the at least two second task leaves to employ for the second topic task; and
   outputting a response to the second dialog input.

9. The method of claim 8, wherein the transferred property or data associated with the first skillset model is used to influence the second skillset model in decision processing.

10. The method of claim 8, wherein analyzing the at least one of the property or action includes providing weight to one or more of the at least two second task leaves until the target leaf is resolved.

11. The method of claim 8, wherein identifying the target leaf further includes querying other data sources for information to resolve the target leaf.

12. The method of claim 8, wherein the target leaf comprises a dynamic response.

13. The method of claim 8, wherein the first skillset model is configured for a particular context or operating environment different from the particular context or operating environment of the second skillset model.

14. The method of claim 11, further comprising:
analyzing the first skillset model and second skillset model to detect an error that will cause failure of the chatbot session, wherein the first return response includes a request to for a response to address the error and the second dialog input addresses the error; and
recursively correcting the error based, at least in part, on second dialog input.

15. An apparatus for generating chatbot sessions in a computing environment, the computing environment comprising one or more computing devices in communication with a chatbot generation system that executes software configured to generate chatbot sessions accessible to the one or more computing devices, a computing device of the one or more computing devices configured to:
receive first dialog input including a request and associated with a first topic task in the chatbot session;
traverse a first decision tree including a first skillset model related to the first topic task to identify at least a first task leaf appropriate to address the first dialog input;
prior to completion of the first topic task, receive in the chatbot session, second dialog input associated with a second topic task different from the first topic task;
provide a first return response to the first dialog input that is an incompletion of the first topic task in the chatbot session;
prior to completion of the first topic task, receiving in the chatbot session, second dialog input in response to the first return response and associated with the request;
determine that the second dialog input is associated with a second topic task different from the first topic task;
transfer to a second decision tree including a second skillset model related to the second topic task, at least one of a property associated with the first task leaf or data associated with the first skillset model;
traverse the second decision tree to identify at least two second task leaves;
analyze at least one of a property or action associated with each of the at least two second task leaves to identify a target leaf of the at least two second task leaves to employ for the second topic task; and
output a response to the second dialog input.

16. The apparatus of claim 15, wherein the transferred property or data associated with the first skillset model is used to influence the second skillset model in decision processing.

17. The apparatus of claim 15, wherein analyzing the at least one of the property or action includes providing weight to one or more of the at least two second task leaves until the target leaf is resolved.

18. The apparatus of claim 15, wherein identifying the target leaf further includes querying other data sources for information to resolve the target leaf.

19. The apparatus of claim 15, wherein the first skillset model is configured for a particular context or operating environment different from the particular context or operating environment of the second skillset model.

20. The apparatus of claim 15, wherein instructions are further for:
analyzing the first skillset model and second skillset model to detect an error that will cause failure of the chatbot session, wherein the first return response includes a request to for a response to address the error and the second dialog input addresses the error; and
recursively correcting the error based, at least in part, on second dialog input.

\* \* \* \* \*

UNITED STATES PATENT AND TRADEMARK OFFICE
CERTIFICATE OF CORRECTION

PATENT NO. : 11,736,418 B2
APPLICATION NO. : 17/242136
DATED : August 22, 2023
INVENTOR(S) : Pelov Page 1 of 1

It is certified that error appears in the above-identified patent and that said Letters Patent is hereby corrected as shown below:

In the Drawings

On sheet 2 of 10, in FIG. 2, and on the title page, the illustrative print figure, under Reference Numeral 204, Line 1, delete "initated?" and insert -- initiated? --, therefor.

On sheet 2 of 10, in FIG. 2, and on the title page, the illustrative print figure, under Reference Numeral 210, Line 2, delete "detemine" and insert -- determine --, therefor.

Signed and Sealed this
Twenty-ninth Day of July, 2025

Coke Morgan Stewart
*Acting Director of the United States Patent and Trademark Office*